(12) United States Patent
Mungikar (10) Patent No.: US 8,306,974 B2
(45) Date of Patent: Nov. 6, 2012

(54) RANKING DATABASE QUERY RESULTS USING AN EFFICIENT METHOD FOR N-ARY SUMMATION

(75) Inventor: Shailesh Kamalakar Mungikar, Kothrud Pune (IN)

(73) Assignee: Sybase, Inc., Dublin, CA (US)

( * ) Notice: Subject to any disclaimer, the term of this patent is extended or adjusted under 35 U.S.C. 154(b) by 222 days.

(21) Appl. No.: 12/944,462

(22) Filed: Nov. 11, 2010

(65) Prior Publication Data

US 2012/0124040 A1    May 17, 2012

(51) Int. Cl.
  *G06F 17/00* (2006.01)
  *G06F 7/00* (2006.01)
(52) U.S. Cl. ................................. 707/728; 704/4; 704/9

(58) Field of Classification Search .................. 707/728; 704/4, 9
  See application file for complete search history.

(56) References Cited

U.S. PATENT DOCUMENTS

| 6,633,868 | B1 * | 10/2003 | Min et al. | 707/999.003 |
| 2008/0059458 | A1 * | 3/2008 | Byron | 707/999.005 |
| 2009/0248661 | A1 * | 10/2009 | Bilenko et al. | 707/999.005 |

* cited by examiner

*Primary Examiner* — Sathyanarayan Pannala
(74) *Attorney, Agent, or Firm* — Sterne, Kessler, Goldstein & Fox P.L.L.C.

(57) ABSTRACT

Ranking database query results using an efficient method for N-ary summation is provided. Such operation, referred to herein as "mid-fold N-ary summation" significantly reduces costs of computation for large numbers of queries, as are common in enterprise database applications. Thus, ranking query results using mid-fold N-ary summation offers improved runtime performance and reduced latency relative to using conventional N-ary summation.

20 Claims, 7 Drawing Sheets

| | Classic N-ary summation | Mid-fold N-ary summation |
|---|---|---|
| Assignment | 2 * N | 1 (or 2 when N is even) |
| | digit | result = N * ((N+1) / 2) |
| | result | result = result + N/2 |
| Arithmetic operations | 2 * N | 3 (or 5 when N is even) |
| | digit + 1 | N+1 |
| | result + digit | (N+1)/2 |
| | | N * (N+1)/2 |
| | | N/2 when N is even |
| | | result + N/2 when N is even |
| Binary operation | 0 | 1 |
| | | N & 0x01 |
| Evaluation | N | 1 |
| | if iteration exceeded N | if N is even |

| | Assignment | Arithmatic ops | Binary ops | Evaluation |
|---|---|---|---|---|
| N-ary sum for N=1 | 2 | 2 | 0 | 1 |
| Mid-fold sum for N=1 | 1 | 3 | 1 | 1 |
| N-ary sum for N=2 | 4 | 4 | 0 | 2 |
| Mid-fold sum for N=2 | 1 | 3 | 1 | 1 |
| N-ary sum for N=3 | 6 | 6 | 0 | 3 |
| Mid-fold sum for N=3 | 1 | 3 | 1 | 1 |

RANKING DATABASE QUERY RESULTS USING AN EFFICIENT METHOD FOR N-ARY SUMMATION

BACKGROUND

1. Field

Embodiments relate generally to databases, particularly to database queries.

2. Background

Computers are very powerful tools for storing and providing access to vast amounts of information. Databases are a common mechanism for storing information on computer systems while providing easy access to users. A typical relational database is an organized collection of related information stored as "records" having "fields" of information. As an example, a database of employees may have a record for each employee where each record contains fields designating specifics about the employee, such as name, home address, salary, and the like.

Databases commonly organize data in the form of tables, each table having a number of rows and columns. Each row in a table generally has a data value associated with each of the columns, this intersection of rows and columns commonly called a cell. Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details.

One purpose of a database system is to answer queries requesting information from the database. A query may be defined as a logical expression over the data and the data relationships set forth in the database, and execution of a query results in the identification of a subset of the database. In operation, for instance, the execution of a request for data from a relational DBMS is typically issued by a client system as one or more Structured Query Language or "SQL" queries for retrieving particular data from database tables located on a server. For example, in response to a request for all employees making over $25,000, the database system typically returns the list of employee names whose salary is greater than $25,000, where a table named "employees" may be defined to include information about employees of a particular organization.

A query usually involves a request for the data contained in one or more cells of any rows that meet a particular condition. This condition often involves the comparison of the values of cells in a column to some other value to determine whether the row associated with the compared cell meets the condition. For example, the condition may involve searching for one or more phrases within text data stored within the database. Each phrase may include one or more terms separated from one another by a space. A database engine or DBMS may employ a searching algorithm that tries to find the closest match for a phrase by matching pairs of words in each row of a database table. To improve the accuracy of search results, the searching algorithm may rank each result according to its relevance to the search criteria.

The rank or relevance of a particular search result may be determined based on a number of different factors. Such factors include, but are not limited to, the proximity of the various phrase terms within a predefined space of each other and the degree to which an exact match for the phrase was returned. For searches involving a single phrase with multiple terms, search results may be ranked according to the number of phrase terms that were returned in each result. Additionally, for searches involving multiple phrases, the relative complexity of the phrases, measured by phrase length (i.e., the number of terms in each phrase), may be an important factor. For example, depending on a given application, a result containing a match for a phrase having a higher number of terms may be preferred over a result with a match for a different phrase having fewer terms.

There are multiple ways to determine the relative complexity of a phrase based on the number of terms the phrase contains. One way is to simply count the number of terms in the phrase. This approach produces a linear correlation between the number of terms in the phrase and the determined complexity of the phrase. However, in order to produce an exponential correlation, in which greater weight is given to a higher number of terms, the searching algorithm may use, for example, N-ary summation to calculate the result. For example, a phrase containing three terms may be given more weight (e.g., by a factor of 2) than a phrase containing two terms, and a phrase containing four terms may be given much more weight (e.g., by a factor of 8) than a phrase containing three terms.

Further, if results comprising partial matches are to be ranked, one factor used by the searching algorithm may be how close a particular match is to a given search phrase. For example, for a search phrase 'a b c d e', a row may include a partial match 'a c e' and another row may include a partial match 'a b c'. In this case, both partial matches have the same number of terms. However, the match 'a b c' may be considered more relevant than the match 'a c e' due to the proximity of the matching terms with respect to the original search phrase. If only the full search phrase match is to be returned, the ranking could be pre-computed for all the rows to be returned. However, if the result should contain partial phrase matches as well, the ranking must be computed for every such partial match.

N-ary summation, also referred to as sigma ($\Sigma$) summation, for a value N is calculated by summing the numbers from one to the value N. For example, the value N is equivalent to the number of terms in a phrase for determining the complexity of the phrase. To compute an N-ary summation using traditional methods, the ranking algorithm must iterate N times and perform a number of operations with each iteration. A search for a set of phrases within an enterprise database system may yield millions of documents, and ranking millions of documents based on the number of terms of a phrase using such traditional methods can become computationally expensive.

BRIEF SUMMARY

Embodiments relate to ranking database query results using an efficient method for N-ary summation. Such efficient method, referred to herein as "mid-fold N-ary summation" significantly reduces costs of computation for large numbers of queries, as are common in enterprise database applications. Thus, ranking query results using mid-fold N-ary summation offers improved runtime performance and reduced latency relative to using conventional N-ary summation.

In one embodiment, a search phrase having two or more search terms is received from a client device. A database query based on the search phrase is executed at a database. The database returns a plurality of search results. Each search result may contain one or more of the search terms in the search phrase. A relevance value is computed for each search result based on mid-fold N-ary summation for a value N. The value N is equivalent to a number of terms in the search results. The cost of the computation in terms of number of total operations using mid-fold N-ary summation for the value N is a fixed regardless of the size of the value N. The computation yields an exponential relationship between the value N and the respective relevance of each search result. The search results from the database are ranked based on the computed relevance of each search result. The ranked search results are then transmitted back to the client device.

In another embodiment, a system for ranking database query results using an efficient method for N-ary summation comprises a query parser, an execution unit, and a results ranker. The query parser is configured to receive a search phrase having two or more search terms from a client device. The execution unit is configured to execute a database query at a database based on the search phrase. The database returns a plurality of search results. Each search result may contain one or more of the search terms in the search phrase. A relevance value is computed by the results ranker for each search result based on mid-fold N-ary summation for a value N. The value N is equivalent to a number of terms in the search results. The cost of the computation in terms of number of total operations using mid-fold N-ary summation for the value N is fixed regardless of the size of the value N. Further, the computation yields an exponential relationship between the value N and the respective relevance of each search result. The results ranker then transmits the ranked search results back to the client device.

Embodiments may be implemented using hardware, firmware, software, or a combination thereof and may be implemented in one or more computer systems or other processing systems.

Further embodiments, features, and advantages of the present invention, as well as the structure and operation of the various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS/FIGURES

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number.

The accompanying drawings, which are incorporated herein and form part of the specification, illustrate the embodiments of present invention and, together with the description, further serve to explain the principles of the invention and to enable a person skilled in the relevant art(s) to make and use the invention.

DETAILED DESCRIPTION

Embodiments relate to database query optimization using an efficient method for computing N-ary summations. While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "database" and "database storage" may be used interchangeably herein to refer broadly and inclusively to any organized digital collection of data that one or more client devices in a database system can use to store and/or retrieve such data. Such a database can include, but is not limited to, a relational database comprising data stored as a series of tables, also referred to as relations, where each table itself comprises one or more rows or records.

The terms "n-ary summation" and "N-ary summation" are used interchangeably herein to refer broadly and inclusively to calculating the summation of a range of integer values from 1 to 'n' or 'N'. N-ary summation is generally expressed using the Greek letter sigma ($\Sigma$). Thus, for a value n, the n-ary summation can be expressed using the notation "$\Sigma n$" and is calculated by summing up digits in the range of 1 to n (i.e., $\Sigma n = n + (n-1) + \ldots + 1$). For example, for $n=7$, $\Sigma 7 = 7+6+5+4+3+2+1=28$.

I. Database System

Figure 1:
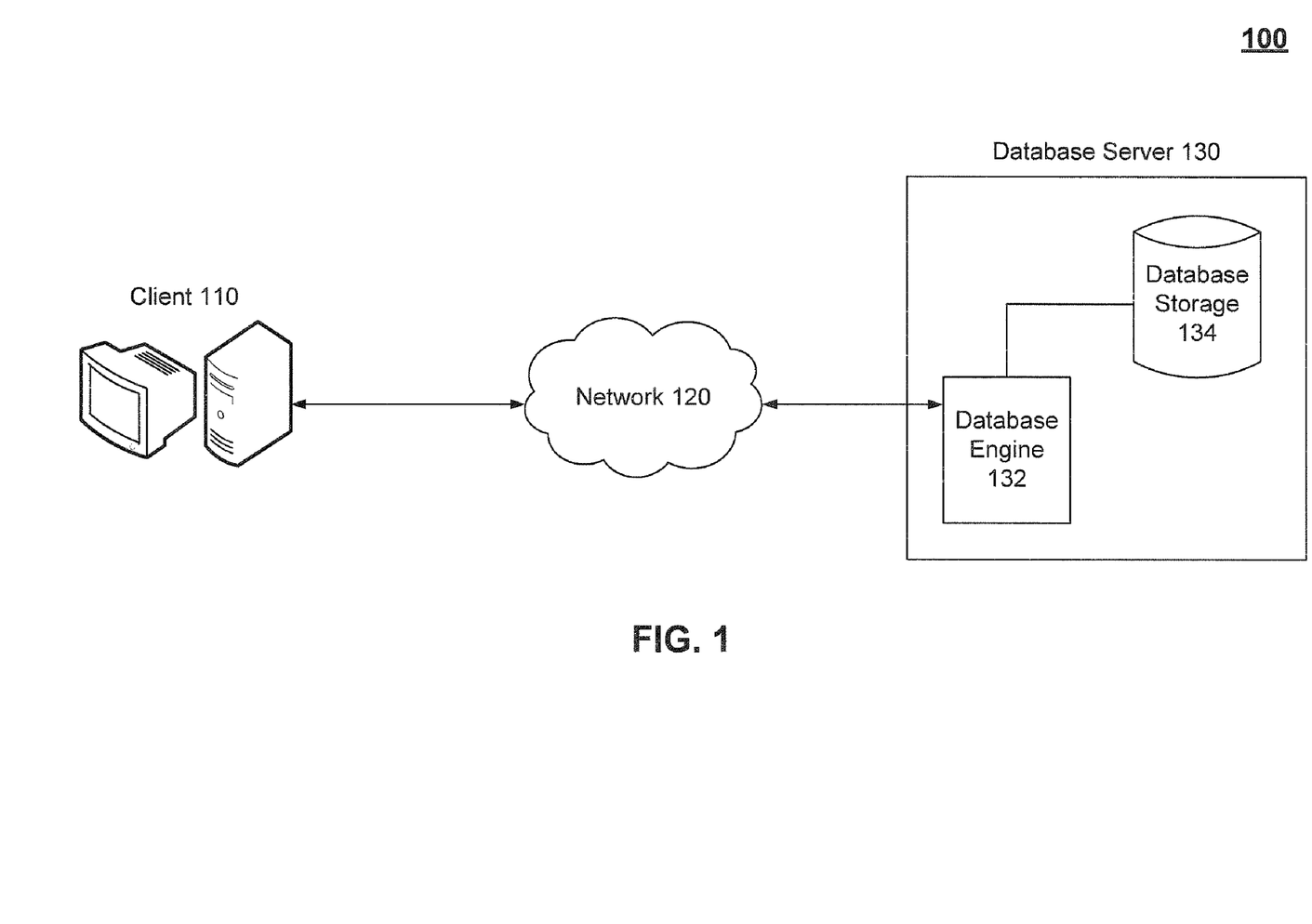
FIG. 1 is a diagram of an exemplary database system in which embodiments may be implemented.

FIG. 1 is a diagram of an exemplary database system 100 in which embodiments may be implemented. Database system 100 includes a client 110, a network 120, and a database server 130. The database server 130 includes a database engine 132 and database storage 134.

Client 110 is operable to send requests for data, commonly in the form of a database queries, to database server 130 over network 120. Database server 130 replies to each request by sending a set of results, commonly in the form of result rows from a database table, to client 110 over network 120. One skilled in the relevant art given this description will appreciate that any data format operable to convey a request for data and a reply to the request may be used. In accordance with an embodiment, the requests and replies are consistent with the conventions used in the Structured Query Language ("SQL"), although this example is provided solely for purposes of illustration and not limitation.

Client 110 can be any type of computing device having one or more processors, a user input (for example, a mouse, QWERTY keyboard, touch-screen, microphone, or a T9 keyboard), and a communications infrastructure capable of receiving and transmitting data over a network. For example, client 110 can include, but is not limited to, a mobile phone, a personal digital assistant (PDA), a computer, a cluster of computers, a set-top box, or other similar type of device capable of processing instructions and receiving and transmitting data to and from humans and other computing devices.

Similarly, database server 130 may be implemented on any type of computing device. Such a computing device can include, but is not limited to, a device having a processor and memory for executing and storing instructions. Software may include one or more applications and an operating system. Hardware can include, but is not limited to, a processor, memory, a user input, a graphical user interface display, and a communications infrastructure capable of receiving and transmitting data over a network. The computing device may also have multiple processors and multiple shared or separate memory components. For example, the computing device may be a clustered computing environment or server farm.

Network 120 can be any network or combination of networks that can carry data communication. Such network can include, but is not limited to, a wired (e.g., Ethernet) or a wireless (e.g., Wi-Fi and 3G) network. In addition, network 120 can include, but is not limited to, a local area network, medium area network, and/or wide area network such as the Internet. Network 120 can support protocols and technology including, but not limited to, Internet or World Wide Web protocols and/or services. Intermediate network routers, gateways, or servers may be provided between components of database system 100 depending upon a particular application or environment.

When a request for data, such as a query, is received by database server 130, it is handled by database engine 132, in accordance with an embodiment of the present invention. Database engine 132 is operable to determine the data requested by the query, obtain the data, and provide a reply to the query. One skilled in the relevant art given this description will appreciate that while database engine 132 is illustrated as a single module in database system 100, database engine 132 may be implemented in a number of ways in order to accomplish the same function, including separating each of the aforementioned operations performed by database engine 132 into individual modules. Accordingly, the illustration of modules in database server 130 is not a limitation on the implementation of database server 130.

Database engine 132 is operable to obtain the data in response to the query from database storage 134, in accordance with an embodiment of the present invention. Database storage 134 stores values of a database in a data structure. In accordance with an embodiment of the present invention, database values are stored in a table data structure, the table having data rows and columns. At the intersection of each row and column is a data cell, the data cell having access to a data value corresponding to the associated row and column. Each column, in accordance with an embodiment of the present invention, has an associated data type, such as "string" or "integer," which is used by database engine 132 and client 110 to interpret data contained in a data cell corresponding to the column. In accordance with an embodiment of the present invention, the database comprises multiple tables.

Additionally, database storage 134 comprises alternate means of indexing data stored in a table of a database, in accordance with an embodiment of the present invention. Database engine 132 is operable to analyze a query to determine whether an available alternate means is useful to optimally access the data stored in a table, then utilizes this alternate means to obtain data from the table, in accordance with an embodiment of the present invention.

Further, database storage 134 may be implemented as a relational database and database engine 132 may be implemented using a database management system (DBMS) or relational database management system (RDBMS), in accordance with an embodiment of the present invention. An example of such an RDBMS is, for example and without limitation, Sybase IQ from Sybase, Inc. of Dublin, Calif. A person skilled in the relevant art given this description would appreciate that embodiments may be operable to work with any DBMS or RDBMS.

For example, database storage 134 may be a relational database in which data is stored as a series of tables, also called relations. Typically resident on the database server 130, each table itself comprises one or more "rows" or "records" (tuples). A typical relational database will contain many tables, each of which stores information about a particular type of entity. Additional details regarding the characteristics of tables and relational databases in general would be apparent to a person skilled in the relevant art given this description.

II. Ranking Query Results Using an Efficient Method For N-ary Summation

Figure 2:
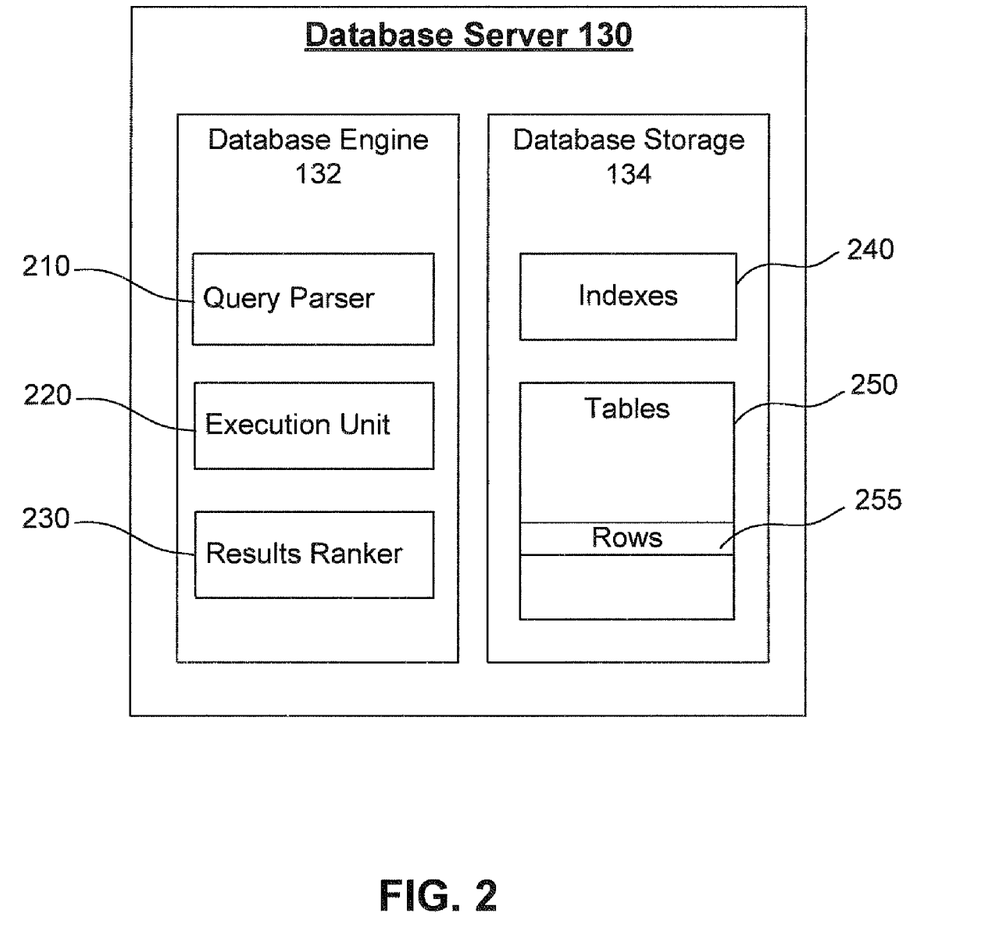
FIG. 2 illustrates an exemplary database server in which embodiments may be implemented.

FIG. 2 illustrates an exemplary database server 130 in which embodiments may be implemented, according to an embodiment. As noted above with respect to FIG. 1 and in the example shown in FIG. 2, database server 130 comprises database engine 132 and database storage 134. In an embodiment, database engine 132 comprises a query parser 210, an execution unit 220, and a results ranker 230. In an embodiment, database storage 134 comprises indexes 240 and one or more database tables 250. Indexes 240 may be used to facilitate accessing data stored in database table(s) 250, in accordance with an embodiment. As shown in FIG. 2, each table within database table(s) 250 comprises one or more rows 255. It is noted that the example database server 130 as shown in FIGS. 1 and 2 and discussed herein solely for purposes of illustration and no limitation. Embodiments are not limited to the examples of FIGS. 1 and/or 2.

In an embodiment, client 110 of FIG. 1 can store data in, or retrieve data from rows 255 of database tables 250 by issuing statements to database server 130. Such statements may include, for example and without limitation, SQL statements. In operation, for example, the client 110 may issue one or more SQL commands to database server 130. SQL commands may specify, for instance, a query for retrieving particular data (i.e., data records meeting the query condition) from database tables 250. In addition to retrieving the data from database tables 250, the clients 110 also has the ability to issue commands to insert new rows of data records into database tables 250, or to update and/or delete existing records in database tables 250.

As noted above, database server 130 may include a DBMS (or RDBMS) to facilitate data access, retrieval, storage, and other database operations between client 110 and database tables 250. Also as noted above, database engine 132, including its components (query parser 210, execution unit 220, and results ranker 230), or portions thereof, may be implemented in such DBMS, according to an embodiment. In addition, such DBMS can have a certain amount of memory at database server 130 available for its use. For example, all data in a typical relational database system is stored in pages on a secondary storage device, usually a hard disk. Typically, these pages may range in size from 1 KB (kilobyte) to 32 KB, with the most common page sizes being 2 KB and 4 KB. It is noted that the above page sizes are included for illustrative purposes only. For example, the pages used in Sybase IQ, mentioned above, ranges in size from 64 KB to 512 KB, with the most common page sizes being 128 KB to 256 KB. It would be apparent to a person skilled in the relevant art given this description that other page sizes may be used as necessary. All input/output operations (I/O) against secondary storage are done in page-sized units. i.e., the entire page is read/written at once. The memory in which pages that have been read from disk reside is called the cache or buffer pool.

In an embodiment, client 110 is configured to enable a user (not shown) to search database storage 134 for information stored therein. For example, the user may use a user input device (e.g., a keyboard) at client 110 to enter and submit queries from client 110 to database server 130. Further, such queries may be sent from client 110 as statements to database server 130, as described above. Additionally, such queries may be in the form of one or more search phrases. Each search phrase can contain one or more search terms. Further, each search phrase may be separated by a search operator including, but not limited to, the "OR" operator, which can also be represented using the '|' (vertical bar) operator. As will be described in further detail below, results ranker 230 is operable to sort or rank search results returned by database storage 134 based on the number of search terms in a single search phrase or in multiple search phrases.

In an embodiment, query parser 210 receives one or more search phrases from client 110. Query parser 210 may convert each received search phrase into a data representation format internally used by database engine 132. For example, if the search phrases comprise SQL statements, these statements may be converted by query parser 210 into a query tree. A query tree is a binary tree data structure that represents the components of the query in a format selected for the convenience of the system. In this regard, query parser 210 employs well known parsing methodology (e.g., recursive descent parsing). A person skilled in the relevant art given this description would appreciate that query parser 210 may perform additional operations on the received search phrases as may be necessary.

Query parser 210 passes the received search phrases, i.e., subsequent to any conversion or reformatting, as noted above, to execution unit 220, in accordance with an embodiment. Execution unit 220 is configured to execute a database query based on the search phrases. In response to the execution of the database query, one or more data records are returned as search results from database storage 134. For example, the search results may comprise data associated with one or more rows from rows 245 associated with one or more tables in database tables 240. Each search result from database storage 134 may comprise one or more of the search terms that match the search phrase. However, it is noted that the database query executed by execution unit 220 may not return any search results if there are no terms within database storage 134 that match the search terms.

In an embodiment, results ranker 230 computes a relevance value for each search result returned from database storage 134 using mid-fold N-ary summation. The following example piece of code shows a conventional way to compute "n-ary" (or "N-ary," as used herein) summation using computer software:

```
input N;
output result;
for N iterations
    digit = digit + 1;
    result = result + digit;
end for
```

In the above example, the "digit" and "result" variables are initialized to zero. The "digit" variable is used to store intermediate values and "result" stores the final result of the N-ary summation for a given input 'N' after 'N' iterations. The cost of computation for such a conventional method for N-ary summation is directly proportional to the value N.

In an embodiment, an alternate, more efficient solution for N-ary summation, referred to as "mid-fold N-ary summation," as noted above, is used by results ranker 230. An advantage of using mid-fold N-ary summation is a fixed cost of computation as the value N increases, as will be described in further detail below. For example, the N-ary summation for a value N equivalent to 7 can be expressed as follows:

$$\Sigma 7 = 7+6+5+4+3+2+1 = 28. \tag{1}$$

Mid-fold N-ary summation rearranges the order of the expression's elements so as to take full advantage of the expression's commutative property (i.e., changing the order does not change the result). For example, the above expression (1) for $\Sigma 7$ can be rearranged as follows:

$$\Sigma 7 = 7+6+1+5+2+4+3 = 28. \tag{2}$$

Expression (2) can be simplified even further, as shown below in expression (3):

$$\Sigma 7 = 7+7+7+7 = 28. \tag{3}$$

Further, expression (3) can be expressed using either expression (4) or (5) below:

$$\Sigma 7 = 7 * \text{ceiling}(7/2) = 28 \tag{4}$$

$$\Sigma 7 = 7 * \text{floor}((7+1)/2) = 28 \tag{5}$$

In another example for value N that is an even number, expressions (6), (7), (8), and (9)/(10) below show a progression of rearranging the expression so as to simplify the computation of the N-ary summation:

$$\Sigma 10 = 10+9+8+7+6+5+4+3+2+1 = 55; \tag{6}$$

$$\Sigma 10 = 10+9+1+8+2+7+3+6+4+5 = 55; \tag{7}$$

$$\Sigma 10 = 10+10+10+10+10+5 = 55; \tag{8}$$

$$\Sigma 10 = 10 * \text{ceiling}(10/2) + (10/2) \tag{9}$$

or $$\Sigma 10 = 10 * \text{floor}((10+1)/2) + (10/2) \tag{10}$$

An example piece of software code for mid-fold N-ary summation may be as follows:

```
input N;
output result;
result = N * ((N+1) /2);
if((N & 0x01) == 0)
    result = result + N/2;
end if
```

As in the example software code for traditional N-ary summation described above, the "result" variable is initialized to zero and is used to store the final result of the N-ary summation for a given input 'N'.

Figure 5:
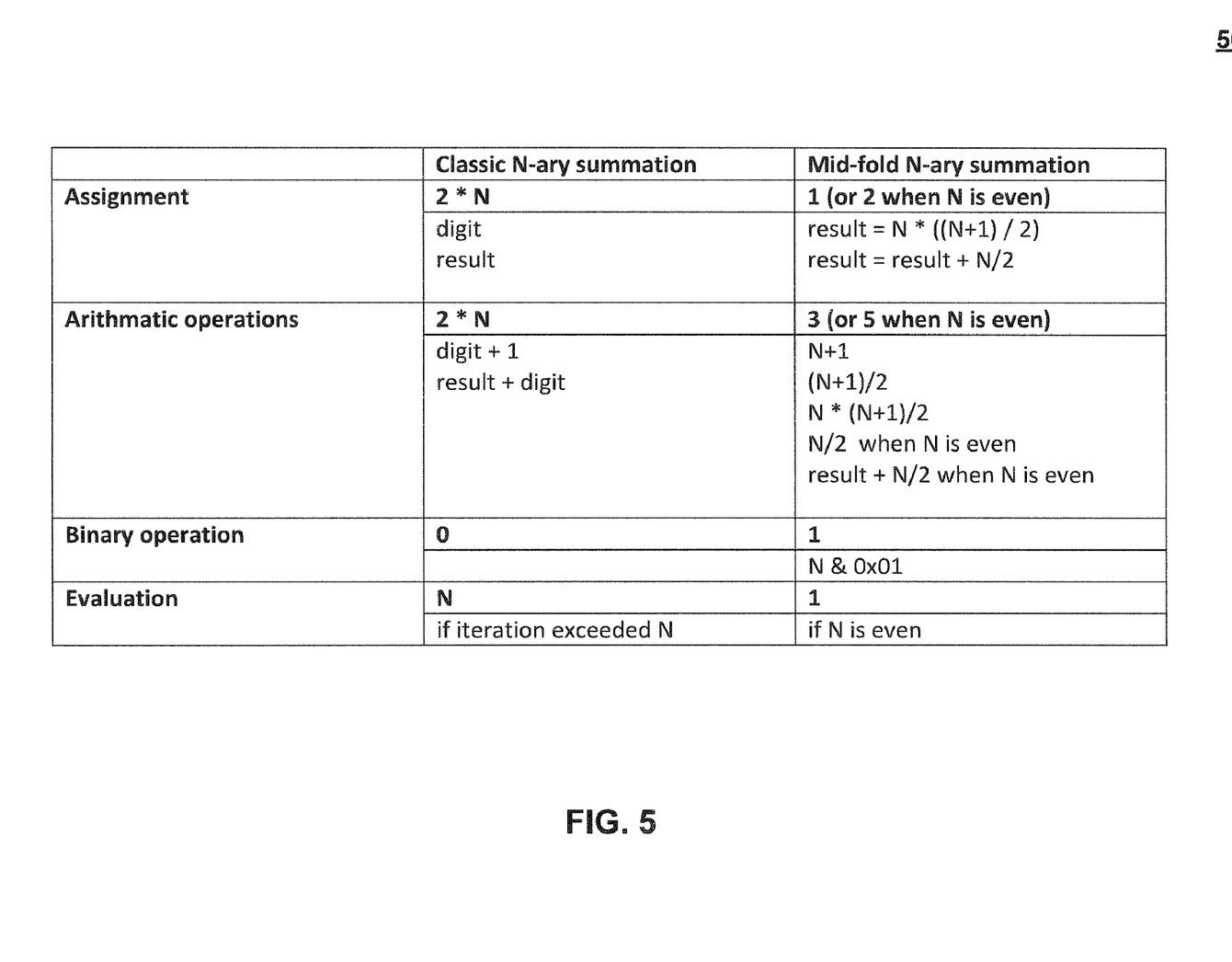
FIG. 5 is a table showing a comparison of computation costs between traditional N-ary summation and mid-fold N-ary summation, in accordance with an embodiment.
Figure 6:
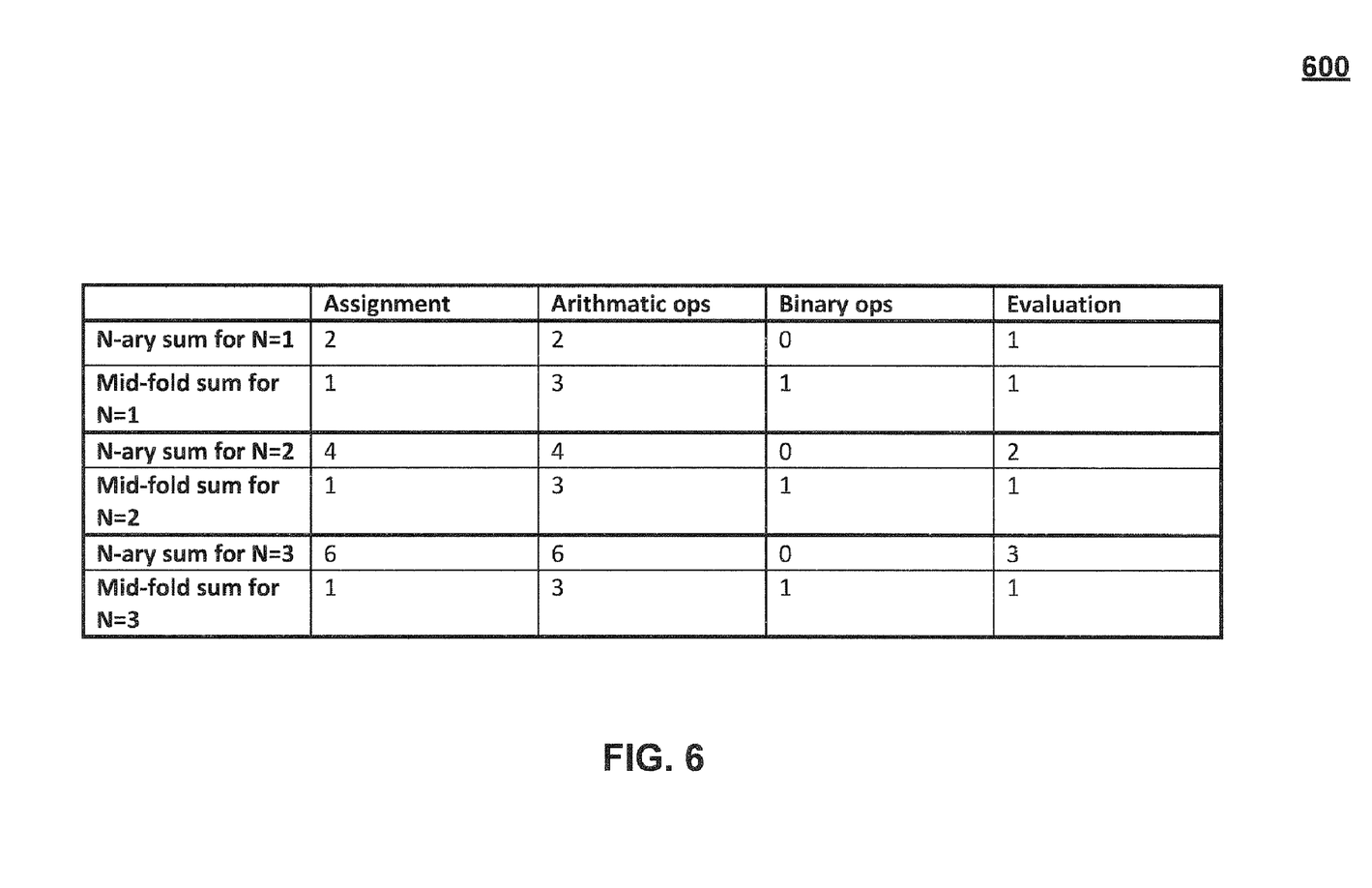
FIG. 6 is a table showing a comparison of computation costs in terms of operations for different values of N between traditional N-ary summation and mid-fold N-ary summation for different values of N, in accordance with an embodiment.

FIG. 5 is a table 500 showing a comparison of computation costs between traditional N-ary summation and mid-fold N-ary summation, in accordance with an embodiment. FIG. 6 is a table 600 showing a comparison of computation costs in terms of operations for different values of N between traditional N-ary summation and mid-fold N-ary summation for different values of N, in accordance with an embodiment. As shown in tables 500 and 600, using mid-fold N-ary summation provides a significant advantage in terms of computation costs over conventional N-ary summation methods as the value N increases. For example, as shown in table 600, for N=3, conventional N-ary summation requires a total of fifteen operations whereas mid-fold N-ary summation requires only six operations. Moreover, the computation costs in terms of total number of operations for mid-fold N-ary summation is fixed regardless of the size of the value of N.

Referring back to FIG. 2, as noted above, results ranker 230 can be configured to compute the relevance for each search result using mid-fold N-ary summation where the value 'N' is set to the number of search terms within a particular search result, according to an embodiment. In a further embodiment, results ranker 230 can determine whether the value N is an even-numbered or odd-numbered value. For example, if it is determined by results ranker 230 that the value N is an odd number (i.e., the number of search terms within the search result is odd), results ranker 230 may compute a respective relevance of the particular search result using the following mid-fold N-ary summation formula: $N \times ((N+1) \div 2)$. Alternatively, if is determined by results ranker 230 that the value of N is an even number, results ranker 230 may compute a respective relevance of the particular search result using the following mid-fold N-ary summation formula: $(N \times ((N+1) \div 2)) + (N \div 2)$.

As noted above, query parser 210 can receive multiple search phrases where each search phrase has one or more search terms, in accordance with an embodiment. For example, two search phrases may be separated by an "OR" operator, as noted above. Thus, the returned search results may comprise a union of data records in which any single data record may include search terms from either search phrase. Accordingly, execution unit 220 executes a database query at database storage 134 based on the multiple search phrases. The search results returned by database storage 134 in response to the executed database query may contain one or more terms from one or more of the search phrases (i.e., assuming that at least one search term from at least one of the search phrases is found within a database record stored in database storage 134).

In an embodiment, if multiple search results are received by query parser 210 and executed by execution unit 220, results ranker 230 can be configured to compute separate sets of relevance values using mid-fold N-ary summation corresponding to each search phrase. Further, results ranker 230 can compare the separate sets of computed relevance values and assign a higher rank to the set of returned search results that include a greater number of search terms. Thus, the rank assigned by results ranker 230 can depend on the complexity of a search phrase in terms of the number of search terms it contains. Simplistically, the number of terms in a search phrase may be compared. However, as this will yield only a linear curve, results ranker 230 can use N-ary summation to yield an exponential curve (2 terms phrase <3 terms phrase <<4 terms phrase <<<5 terms phrase, i.e., phrases with a greater number of terms are assigned a higher rank). To reduce computation costs and improve performance, results ranker 230 can use mid-fold N-ary summation, as described above, in order to quickly calculate the result or ranking of search results.

It is noted that the above-described exponential curve for search results may be obtained using other techniques such as, for example, using $N^2$ (N raised to the power of 2). However, $N^2$ produces a relatively steep exponential curve of results than an N-ary summation. For example, for N=2, 3, and 4, the N-ary sum produces sums 3, 6, and 10, respectively. For the same N values, $N^2$ produces 4, 9, and 16, results that are less linear than the results produced by the N-ary summation, thereby reducing the granularity of search results. Further, the N-ary summation method calculates the total number of term-pairs that are matched in a phrase. A query involving multiple phrases could benefit from such ranking scheme. For example, a phrase with three terms may have three term-pair matches. Thus, if the phrase is 'a b c'. The term-pair matches are 'a b', 'b c', and 'a . c' where the '.' (dot) denotes any other term. Accordingly, the N-ary summation has direct relevance to the terms being matched and the distance among them.

In an example, results ranker 230 may be configured to rank partial match results for a particular search phrase. One factor that could be used for the ranking can be, for example, the degree of similarity of a partial match to a search phrase (i.e., how close a partial match matches the search phrase). For example, a search phrase 'a b c d e' may produce two separate partial matches within different database rows. One row may include a partial match 'a c e' while a second row may include a partial match 'a b c'. In this example, both partial matches have the same number of terms. However, the second partial match ('a b c') may be more relevant than the former ('a c e') due to the relative proximity of the partially matching terms with respect to the original search phrase. In this regard, the first match may be considered a "partial terms match" and the second match may be considered a "partial phrase match."

Accordingly, results ranker 230 may rank the second match higher than the "partial terms match." By using N-ary summation to rank match results (or partial match results) for a search phrase, results ranker 230 can rank results based not only on number of search terms in a match, but also based on the relative proximity of the search terms within the results. If only a full search phrase match is to be returned, the ranking could be pre-computed for all the rows to be returned. However, if the result should contain partial phrase matches as well, the ranking must be computed for every such partial match. Thus, by using mid-fold N-ary summation, a significant reduction in computational costs may be achieved.

III. Method

Figure 3:
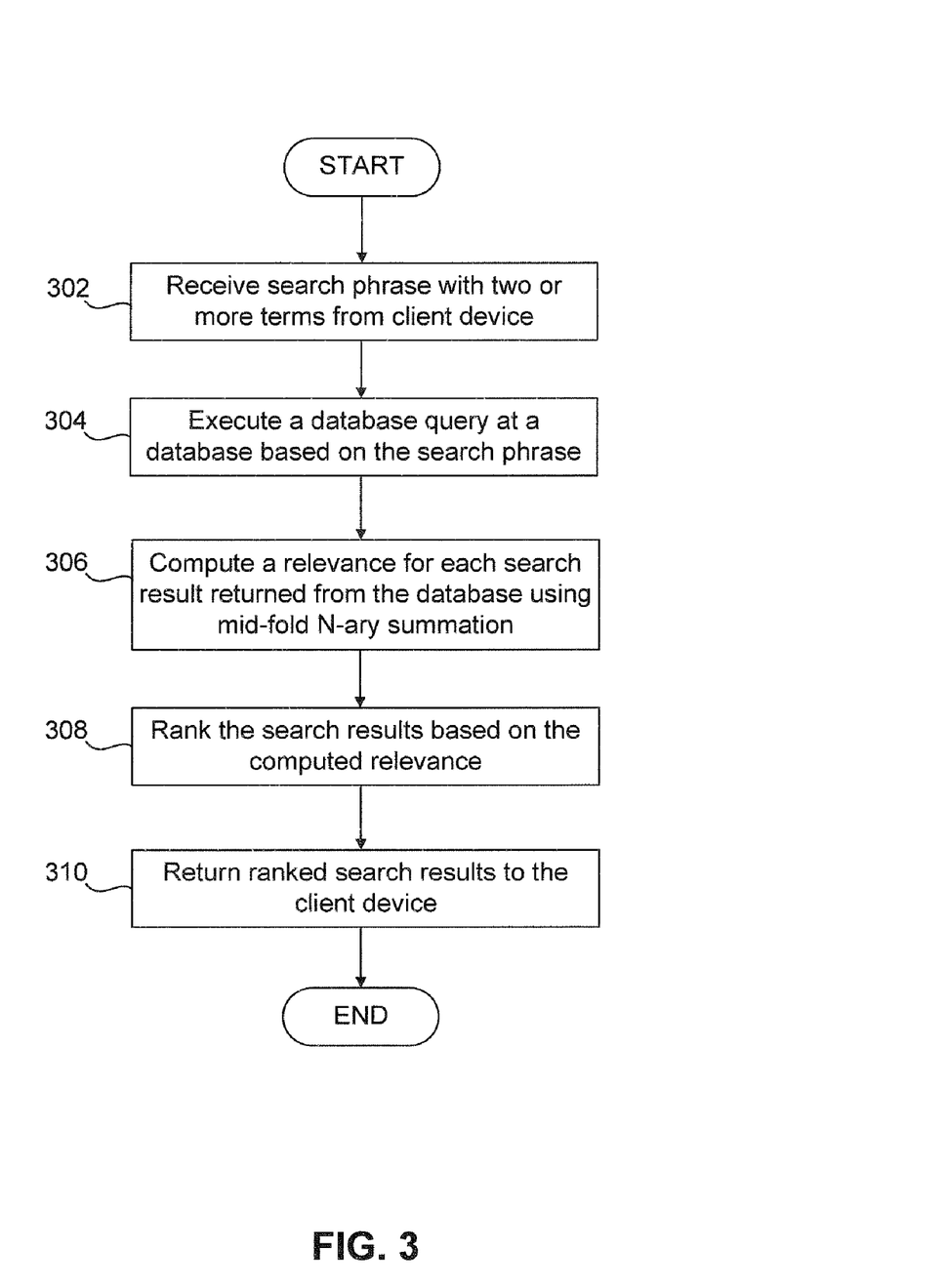
FIG. 3 is a flowchart of an exemplary method for ranking query results using mid-fold N-ary summation, according to an embodiment.

FIG. 3 is a flowchart of an exemplary method 300 for ranking query results using mid-fold N-ary summation, according to an embodiment. Method 300 includes steps 302, 304, 306, 308, and 310. For ease of explanation, database system 100 of FIG. 1 and database server 130 of FIGS. 1 and 2, as described above will be used to describe method 300, but is not intended to be limited thereto.

Method 300 begins in step 302, in which a search phrase with two or more terms is received from a client device. In an embodiment, two or more search phrase, each containing one or more search terms may be received. Step 302 may be performed by, for example, query parser 210, described above. Method 300 then proceeds to step 304 in which a database query is executed at a database based on the received search phrase(s). Step 304 may be performed by, for example, execution unit 220, described above.

Figure 4:
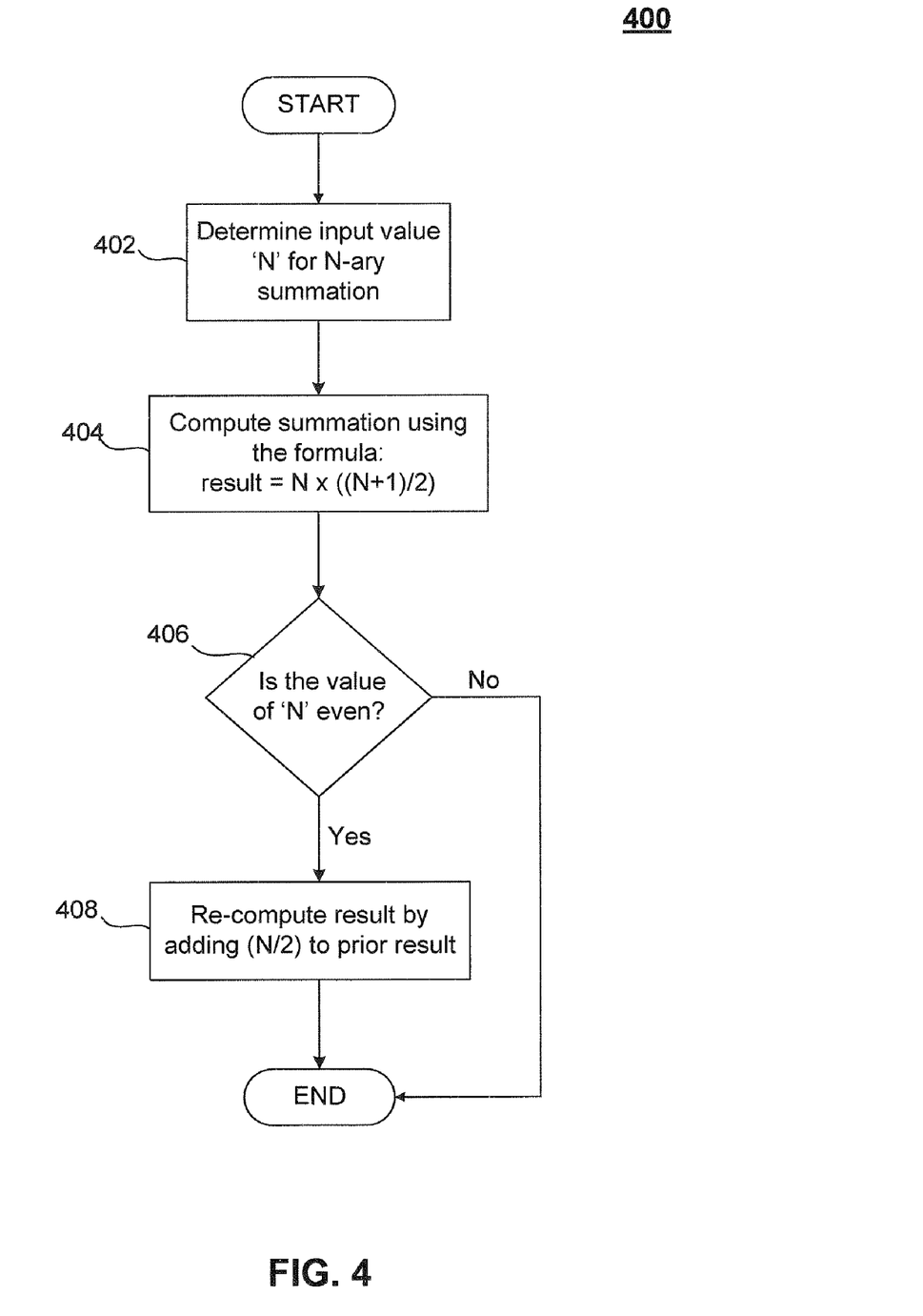
FIG. 4 is a flowchart of an exemplary method for computing a mid-fold N-ary summation, according to an embodiment.

In step 306, a relevance value is computed for each search result returned from the database using mid-fold N-ary summation, as described above. FIG. 4 is a flowchart of an exemplary method 400 for computing a mid-fold N-ary summation, according to an embodiment. Method 400 includes steps 402, 404, 406, and 408. In step 402, an input value 'N' is determined. As noted above, such value N may be determined according to a number of search terms within a search phrase. Once the value N is determined, method 400 proceeds to step 404, which includes computing the mid-fold N-ary summation using the formula: result=N×((N+1)/2).

In step 406, it is determined whether the value of N is an even number. If it is determined that the value N is even, method 400 proceeds to step 408, in which the result is recomputed by adding (N/2) to the prior result (i.e., the formula: [N×((N+1)/2)]+(N/2)). Method 400 concludes after the result is recomputed if the value N is even or if the value N is determined to be odd at step 406.

Steps 402, 404, 406, and 408 may be performed by, for example, results ranker 330 of FIG. 1, described above. Method 400 and mid-fold N-ary summation, as noted above, provide significant advantages in terms of reducing computation costs in comparison to traditional methods of computing N-ary summation.

Referring back to FIG. 3, method 300 proceeds to step 308, in which the search results are ranked based on the computed relevance in step 306. In other words, the search results are numerically ordered using the relevance values determined in step 306. Method 300 concludes after step 310, in which the ranked search results are transmitted to the client device. Step 308 and step 310 may be performed by, for example, results ranker 230, described above.

An advantage of method 300 is providing a capability to rank database query results using an efficient method for N-ary summation (i.e., mid-fold N-ary summation). Such efficient method can significantly reduce costs of computation, particularly for large numbers of database queries and query search results.

IV. Example Computer System

Aspects of the present invention shown in FIGS. 1-6, or any part(s) or function(s) thereof, may be implemented using hardware, software modules, firmware, tangible computer readable media having instructions stored thereon, or a combination thereof and may be implemented in one or more computer systems or other processing systems.

Figure 7:
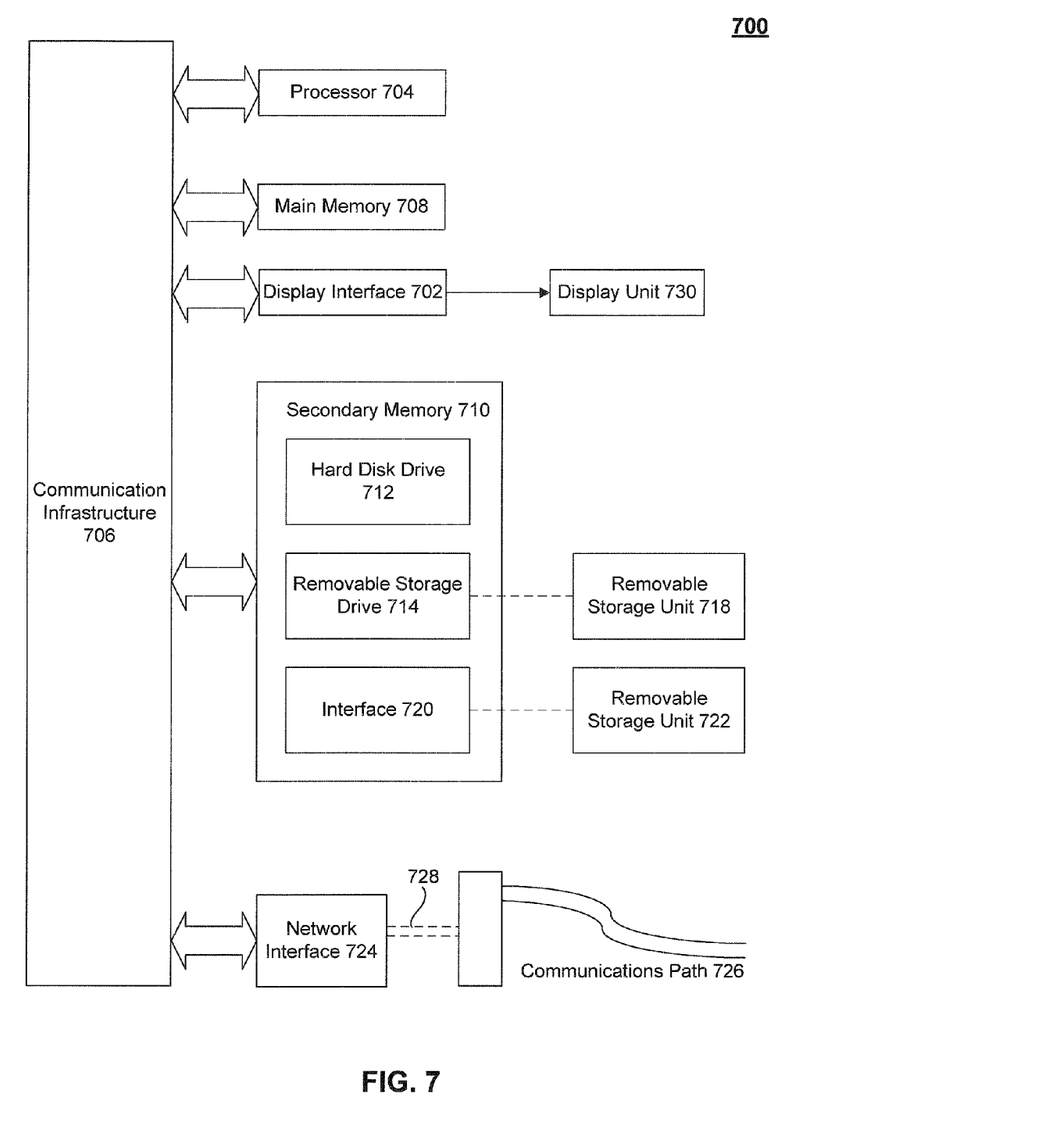
FIG. 7 is a diagram of an example computer system in which embodiments can be implemented.

FIG. 7 illustrates an example computer system 700 in which embodiments of the present invention, or portions thereof, may be implemented as computer-readable code. For example, database server 130 of system 100, can be implemented in computer system 700 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-6.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 700. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 704 may be a special purpose or a general purpose processor device. As will be appreciated by persons skilled in the relevant art, processor device 704 may also be a single processor in a multi-core/multiprocessor system, such system operating alone, or in a cluster of computing devices operating in a cluster or server farm. Processor device 704 is connected to a communication infrastructure 706, for example, a bus, message queue, network, or multi-core message-passing scheme.

Computer system 700 also includes a main memory 708, for example, random access memory (RAM), and may also include a secondary memory 710. Secondary memory 710 may include, for example, a hard disk drive 712, removable storage drive 714. Removable storage drive 714 may comprise a floppy disk drive, a magnetic tape drive, an optical disk drive, a flash memory, or the like. The removable storage drive 714 reads from and/or writes to a removable storage unit 718 in a well known manner. Removable storage unit 718 may comprise a floppy disk, magnetic tape, optical disk, etc. which is read by and written to by removable storage drive 714. As will be appreciated by persons skilled in the relevant art, removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 may be in the form of signals, which may be electronic, electromagnetic, optical, or other signals capable of being received by communications interface 724. These signals may be provided to communications interface 724 via a communications path 726. Communications path 726 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 718, removable storage unit 722, and a hard disk installed in hard disk drive 712. Computer program medium and computer usable medium may also refer to memories, such as main memory 708 and secondary memory 710, which may be memory semiconductors (e.g. DRAMs, etc.).

Computer programs (also called computer control logic) are stored in main memory 708 and/or secondary memory 710. Computer programs may also be received via communications interface 724. Such computer programs, when executed, enable computer system 700 to implement the present invention as discussed herein. In particular, the computer programs, when executed, enable processor device 704 to implement the processes of the present invention, such as the stages in the methods illustrated by flowcharts 300 and 400 of FIGS. 3 and 4, respectively, discussed above. Accordingly, such computer programs represent controllers of the computer system 700. Where the invention is implemented using software, the software may be stored in a computer program product and loaded into computer system 700 using removable storage drive 714, interface 720, and hard disk drive 712, or communications interface 724.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

V. Conclusion

The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for ranking query results using mid-fold N-ary summation, comprising:
    receiving a first search phrase having a first plurality of search terms from a client device;
    executing a database query at a database based on the search phrase, wherein the database returns search results in response to the executing, and wherein each search result in the returned search results may contain one or more terms of the first plurality of search terms;
    computing a first relevance value for each search result in the returned search results using mid-fold N-ary summation based on a first value N, wherein the first value N is equivalent to a number of terms from the first plurality of search terms in each search result, and wherein the mid-fold N-ary summation is computed using a fixed number of operations regardless of a size of the first value N;
    ranking the returned search results from the database based on the computed first relevance value of each search result, wherein the ranking yields an exponential relationship between the number of search terms in each search result and the computed first relevance values of the returned search results; and
    transmitting the ranked search results to the client device,
    wherein the receiving, the executing, the computing, the ranking, and the transmitting are performed using one or more computing devices.

2. The method of claim 1, wherein the computing further comprises:
    determining whether the first value N is an even number or an odd number;
    computing the first relevance value using a first mid-fold N-ary summation formula based on the determining, wherein the first value N is an odd number, and wherein the first mid-fold N-ary summation formula is: $N \times ((N+1) \div 2)$; and
    computing the first relevance value using a second mid-fold N-ary summation formula based on the determining, wherein the first value N is an even number, and wherein the second mid-fold N-ary summation formula is: $(N \times ((N+1) \div 2)) + (N \div 2)$.

3. The method of claim 1, wherein the database is a relational database.

4. The method of claim 3, wherein the returned search results comprise a plurality of rows from one or more tables in the relational database.

5. The method of claim 1,
    wherein the receiving further comprises:
        receiving a second search phrase having a second plurality of search terms from the client device,
    wherein the executing comprises:
        executing the database query at the database based on the first and second search phrases, wherein each search result in the returned search results may contain one or more terms from the first and second plurality of search terms of the first and second search phrases, wherein the computing further comprises:
computing a second relevance value for each search result in the returned search results using mid-fold N-ary summation based on a second value N, wherein the second value N is equivalent to a number of terms from the second plurality of search terms in each search result, and wherein the mid-fold N-ary summation is computed using a fixed number of operations regardless of a size of the second value N, and wherein the ranking comprises:
comparing the computed first relevance with the computed second relevance; and
ranking the returned search results from the database based on the comparing, wherein the ranking yields an exponential relationship between the number of search terms in each search result and the computed first or second relevance values based on the comparing.

6. The method of claim 5,
wherein the computing the first relevance value further comprises:
determining whether the first value N is an even number or an odd number;
computing the first relevance value using a first mid-fold N-ary summation formula based on the determining, wherein the first value N is an odd number, and wherein the first mid-fold N-ary summation formula is: $N \times ((N+1) \div 2)$; and
computing the first relevance value using a second mid-fold N-ary summation formula based on the determining, wherein the first value N is an even number, and wherein the second mid-fold N-ary summation formula is: $(N \times ((N+1) \div 2)) + (N \div 2)$, and wherein the computing the second relevance further comprises:
determining whether the second value N is an even number or an odd number;
computing the second relevance value using a first mid-fold N-ary summation formula based on the determining, wherein the second value N is an odd number, and wherein the first mid-fold N-ary summation formula is: $N \times ((N+1) \div 2)$; and
computing the second relevance value using a second mid-fold N-ary summation formula based on the determining, wherein the second value N is an even number, and wherein the second mid-fold N-ary summation formula is: $(N \times ((N+1) \div 2)) + (N \div 2)$.

7. A computer readable storage medium having instructions stored thereon that, when executed by a computing device, cause the computing device to perform operations comprising:
receiving a first search phrase having a first plurality of search terms from a client device;
executing a database query at a database based on the search phrase, wherein the database returns search results in response to the executing, and wherein each search result in the returned search results may contain one or more terms of the first plurality of search terms;
computing a first relevance value for each search result in the returned search results using mid-fold N-ary summation based on a first value N, wherein the first value N is equivalent to a number of terms from the first plurality of search terms in each search result, and wherein the mid-fold N-ary summation is computed using a fixed number of operations regardless of a size of the first value N;
ranking the returned search results from the database based on the computed first relevance value of each search result, wherein the ranking yields an exponential relationship between the number of search terms in each search result and the computed first relevance values of the returned search results; and
transmitting the ranked search results to the client device.

8. The computer readable storage medium of claim 7, wherein the computing further comprises:
determining whether the first value N is an even number or an odd number;
computing the first relevance value using a first mid-fold N-ary summation formula based on the determining, wherein the first value N is an odd number, and wherein the first mid-fold N-ary summation formula is: $N \times ((N+1) \div 2)$; and
computing the first relevance value using a second mid-fold N-ary summation formula based on the determining, wherein the first value N is an even number, and wherein the second mid-fold N-ary summation formula is: $(N \times ((N+1) \div 2)) + (N \div 2)$.

9. The computer readable storage medium of claim 7, wherein the database is a relational database.

10. The computer readable storage medium of claim 9, wherein the returned search results comprise a plurality of rows from one or more tables in the relational database.

11. The computer readable storage medium of claim 7,
wherein the receiving further comprises:
receiving a second search phrase having a second plurality of search terms from the client device,
wherein the executing comprises:
executing the database query at the database based on the first and second search phrases, wherein each search result in the returned search results may contain one or more terms from the first and second plurality of search terms of the first and second search phrases,
wherein the computing further comprises:
computing a second relevance value for each search result in the returned search results using mid-fold N-ary summation based on a second value N, wherein the second value N is equivalent to a number of terms from the second plurality of search terms in each search result, and wherein the mid-fold N-ary summation is computed using a fixed number of operations regardless of a size of the second value N, and
wherein the ranking comprises:
comparing the computed first relevance with the computed second relevance; and
ranking the returned search results from the database based on the comparing, wherein the ranking yields an exponential relationship between the number of search terms in each search result and the computed first or second relevance values based on the comparing.

12. The computer readable storage medium of claim 11,
wherein the computing the first relevance value further comprises:
determining whether the first value N is an even number or an odd number;
computing the first relevance value using a first mid-fold N-ary summation formula based on the determining, wherein the first value N is an odd number, and wherein the first mid-fold N-ary summation formula is: $N \times ((N+1) \div 2)$; and
computing the first relevance value using a second mid-fold N-ary summation formula based on the determining, wherein the first value N is an even number, and wherein the second mid-fold N-ary summation formula is: $(N \times ((N+1) \div 2)) + (N \div 2)$, and wherein the computing the second relevance further comprises:

determining whether the second value N is an even number or an odd number;

computing the second relevance value using a first mid-fold N-ary summation formula based on the determining, wherein the second value N is an odd number, and wherein the first mid-fold N-ary summation formula is: $N \times ((N+1) \div 2)$; and computing the second relevance value using a second mid-fold N-ary summation formula based on the determining, wherein the second value N is an even number, and wherein the second mid-fold N-ary summation formula is: $(N \times ((N+1) \div 2)) + (N \div 2)$.

13. A system for ranking query results using mid-fold N-ary summation, comprising:

a query parser to receive a first search phrase having a first plurality of search terms from a client device;

an execution unit to execute a database query at a database based on the search phrase, wherein the database returns search results, and wherein each search result in the returned search results may contain one or more terms of the first plurality of search terms;

a results ranker to compute a first relevance value for each search result in the returned search results using mid-fold N-ary summation based on a first value N, wherein the first value N is equivalent to a number of terms from the first plurality of search terms in each search result, and wherein the mid-fold N-ary summation is computed using a fixed number of operations regardless of a size of the first value N, to rank the returned search results from the database based on the computed first relevance value of each search result, wherein the ranking yields an exponential relationship between the number of search terms in each search result and the computed first relevance values of the returned search results, and to transmit the ranked search results to the client device.

14. The system of claim 13, wherein the results ranker is further configured to determine whether the first value N is an even number or an odd number, to compute the first relevance value using a first mid-fold N-ary summation formula based on the determination, wherein the first value N is an odd number, and wherein the first mid-fold N-ary summation formula is: $N \times ((N+1) \div 2)$, and to compute the first relevance value using a second mid-fold N-ary summation formula based on the determination, wherein the first value N is an even number, and wherein the second mid-fold N-ary summation formula is: $(N \times ((N+1) \div 2)) + (N \div 2)$.

15. The system of claim 13, wherein the database is a relational database.

16. The system of claim 15, wherein the returned search results comprise a plurality of rows from one or more tables in the relational database.

17. The system of claim 16, wherein the one or more tables are stored in at least a portion of a memory in a server.

18. The system of claim 17, wherein the query parser, the execution unit, and the results ranker are implemented in a database management system in the server.

19. The system of claim 13, wherein the query parser is further configured to receive a second search phrase having a second plurality of search terms from the client device, wherein the execution unit is configured to execute the database query at the database based on the first and second search phrases, wherein each search result in the returned search results may contain one or more terms from the first and second plurality of search terms of the first and second search phrases, wherein the results ranker is further configured to compute a second relevance value for each search result in the returned search results using mid-fold N-ary summation based on a second value N, wherein the second value N is equivalent to a number of terms from the second plurality of search terms in each search result, and wherein the mid-fold N-ary summation is computed using a fixed number of operations regardless of a size of the second value N, to compare the computed first relevance with the computed second relevance, and to rank the returned search results from the database based on the comparison, wherein the ranking yields an exponential relationship between the number of search terms in each search result and the computed first or second relevance values based on the comparison.

20. The system of claim 19, wherein the results ranker is further configured to determine whether the first value N is an even number or an odd number, to compute the first relevance value using a first mid-fold N-ary summation formula based on the determining, wherein the first value N is an odd number, and wherein the first mid-fold N-ary summation formula is: $N \times ((N+1) \div 2)$, to compute the first relevance value using a second mid-fold N-ary summation formula based on the determining, wherein the first value N is an even number, and wherein the second mid-fold N-ary summation formula is: $(N \times ((N+1) \div 2)) + (N \div 2)$, to determine whether the second value N is an even number or an odd number, to compute the second relevance value using a first mid-fold N-ary summation formula based on the determining, wherein the second value N is an odd number, and wherein the first mid-fold N-ary summation formula is: $N \times ((N+1) \div 2)$, and to compute the second relevance value using a second mid-fold N-ary summation formula based on the determining, wherein the second value N is an even number, and wherein the second mid-fold N-ary summation formula is: $(N \times ((N+1) \div 2)) + (N \div 2)$.

\* \* \* \* \*